United States Patent [19]

Zmek et al.

[11] Patent Number: 5,274,479

[45] Date of Patent: Dec. 28, 1993

[54] MIRROR ALIGNMENT AND/OR FIGURE SENSING WITH SURFACE MOUNTED HOLOGRAPHIC OPTICAL ELEMENTS

[75] Inventors: William Zmek, Naugatuck; Gon-Yen Shen, Brookfield, both of Conn.

[73] Assignee: Hughes Aircraft Company, Los Angeles, Calif.

[21] Appl. No.: 922,455

[22] Filed: Jul. 30, 1992

[51] Int. Cl.⁵ .............................................. G02B 27/44
[52] U.S. Cl. ................... 359/15; 250/201.9; 359/565; 359/849; 356/121
[58] Field of Search ........................................ 359/15,565,566,572,846,849; 250/201.9; 356/121, 124

[56] References Cited

U.S. PATENT DOCUMENTS

| | | | |
|---|---|---|---|
| 4,986,641 | 1/1991 | Braat | 359/15 |
| 5,198,653 | 3/1993 | Shen et al. | 250/201.9 |
| 5,214,535 | 5/1993 | Harris et al. | 359/572 |

OTHER PUBLICATIONS

Slinger et al, "Off-axis holographic zone plates recorded and reconstructed by cylindrical wavefronts", Optica Acta, 1984, vol. 31, No. 7, pp. 745-758.

Primary Examiner—Edward K. Look
Assistant Examiner—F. Daniel Lopez
Attorney, Agent, or Firm—Michael W. Sales; Wanda K. Denson-Low

[57] ABSTRACT

A procedure for supplying a mirror (22), such as the mirror of an astronomical telescope (60), with holographic optical elements (38), suitable for use with an active mirror alignment system such as a Hartman optical mirror alignment system, is accomplished by constructing each holographic optical element as a separate unitary structure of a transparent substrate (56) with zone plate features. The zone plate features include the channels (64) and ridges (66) of a fragmentary portion of a zone plate etched into a face (58) of the substrate. The substrate is mounted to the mirror by placing the etched face of the holographic optical element in contact with the reflecting surface (68) of the mirror. An adhesive (70) may be applied around the perimeter of the substrate to secure the substrate in its position upon the mirror. This arrangement of mounting the substrate to the mirror protects the etched face of the holographic optical element from environmental damage, and from the stripping and reapplying of a coating during a refurbishing of the mirror.

12 Claims, 3 Drawing Sheets

MIRROR ALIGNMENT AND/OR FIGURE SENSING WITH SURFACE MOUNTED HOLOGRAPHIC OPTICAL ELEMENTS

BACKGROUND OF THE INVENTION

This invention relates to the alignment of a mirror in an optical system, as well as figure sensing in the optical system, such as an astronomical telescope, by use of optical elements disposed on a reflective surface of the mirror to develop alignment beams of light and, more particularly, to the construction of the optical elements as holographic optical elements (HOE's) by fabrication of each holographic element as a separate assembly of transparent substrate with zone-plate surface features isolated from a reflective coating of the mirror, which coating may be renewed periodically for counteracting weathering of the coating.

Telescopes employed for viewing stars and other distant objects are constructed frequently with a large primary mirror for gather light from the subject being viewed. In one form of construction employing an actively controlled mirror, the primary mirror is formed with a relatively light weight supporting structure which allows for a relatively small amount of deformation of the mirror reflecting surface. While the deformation is small, it is enough to degrade an image obtained by the telescope. The image is corrected by computer reconstruction employing actuators which support the primary mirror or a separate active mirror. A test light beam is used to develop numerous local sample beams diffracted from the holographic optical elements and directed to numerous detectors to check the alignment or deformation of the primary mirror. Any deformation or misalignment of even a portion of the mirror introduces a deflection of a plurality of the beams, which is sensed by the detectors so as to describe the actual mirror reflecting surface. This information allows a computer to correct the resulting image to compensate for effects of the mirror deformation, thereby to provide an accurately formed image of a target. One such optical surface and alignment sensing system is known as the Hartmann system.

A problem arises in that the telescope is often employed in an outside environment wherein weather may produce a degradation or deterioration of the metallic reflecting coating of the mirror. This defective coating is corrected periodically by stripping it from the mirror and applying a new reflective coating to the front surface of the mirror. However, in the Hartmann figure sensing system, the conventional approach is to construct the optical element which generate the sample beams as holographic optical elements by etching zone plate features directly into the reflecting surface of the mirror. For example, the holographic optical elements may be etched directly into the surface or coating of an optic, for instance, into a layer of chromium directly underneath the final reflective metal layer of the mirror. Subsequently, during a refurbishing of the mirror by the aforementioned stripping and reapplication of the coating, the holographic optical elements are damaged, or even totally eradicated, and must be reconstructed by an undesirably complex and costly process of wet lithography for contact printing of the zone plate features.

SUMMARY OF THE INVENTION

The aforementioned problem is overcome and other advantages are provided by a procedure for supplying a mirror, such as the primary mirror of an astronomical telescope, with sub-aperture optical elements such as holographic optical elements suitable for use with an active mirror alignment system such as a Hartmann mirror figure sensing system. The invention enables a refurbishing of the mirror without reconstruction of the HOE's, the refurbishing being accomplished by a relatively facile local protection of the HOE's during a stripping and reapplication of the coating. The procedure is accomplished in accordance with the invention, in the case of HOE's, by constructing each holographic optical element as a separate unitary structure of transparent substrate with the channels and ridges of a zone plate, or fragmentary portion of a large zone plate equal in size to the mirror, etched into a face of the substrate. The substrate is mounted to the mirror by placing the etched face of the holographic optical element in contact with the reflecting surface of the mirror. An adhesive may be applied around the perimeter of the substrate to secured the substrate in its position upon the mirror. This arrangement of mounting the substrate to the mirror protects the etched face of the holographic optical element from environmental damage. During a refurbishing of the mirror, the holographic optical element may be covered with a covering which provides protection from the stripping and coating processes, thereby enabling the refurbishing to be accomplished in accordance with its normal procedure without effecting the holographic optical element. Should it be necessary to remove the holographic optical element, this is readily accomplished by removal of the adhesive which secures the substrate to the mirror. As a further advantage of the invention, the initial alignment of the holographic optical element, as it is placed on and attached to the main mirror, is simpler than and less prone to positional errors associated with a wet-lithographic process.

BRIEF DESCRIPTION OF THE DRAWING

The aforementioned aspects and other features of the invention are explained in the following description, taken in connection with the accompanying drawing wherein.

DETAILED DESCRIPTION

Figure 1:
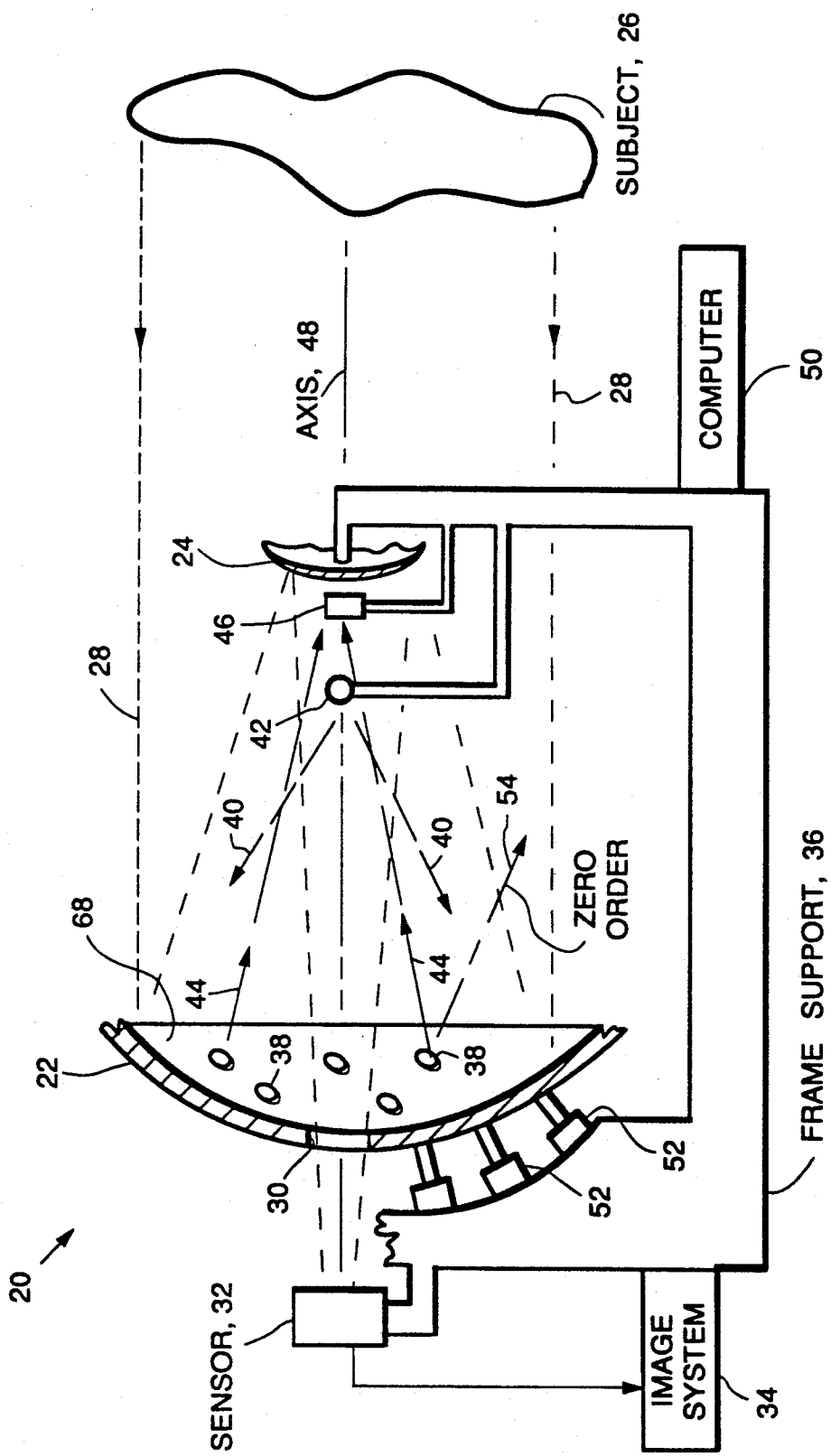
FIG. 1 shows a diagrammatic view of a telescope employing sub-aperture optical elements formed as holographic optical elements for wavefront or figure sensing of a primary mirror of the telescope, primary and secondary mirrors being shown in section.

FIG. 1 shows, by way of example in the practice of the invention, a telescope 20 comprising a primary mirror 22 and a secondary mirror 24 for viewing a distant subject 26. Rays 28 of radiation emanating from the subject 26 are captured by a concave reflecting surface of the primary mirror 22 and directed towards a convex reflecting surface of the secondary mirror 24. The rays are reflected then by the secondary mirror 24 through a central hole 30 in the primary mirror 22 to impinge upon a sensor 32 which senses the intensity of the radiation and outputs an electric signal to an imaging system 34. By way of example, the sensor 32 may comprise a two-dimensional array of radiation detector elements for obtaining image data of the subject 26, the imaging system 34 including means (not shown) for displaying an image of the subject 26. Alternatively, the sensor 32 may be an ocular to enable manual viewing of the image, and the imaging system 34 may be a film plate to provide a photographic image of the subject 26. The primary mirror 22, the secondary mirror 24 and the sensor 32 are supported in their respective positions by a frame 36, indicated schematically, which rigidly holds the components of the telescope 20 in their desired locations to ensure accurate sighting of the subject 26.

Wavefront or figure sensing of the primary mirror 22 is accomplished by locating optical elements 38, constructed preferably as holographic optical elements (HOE's), at various locations on the reflecting front surface of the primary mirror 22, facing the secondary mirror 24. The optical elements 38 are illuminated with monochromatic light, indicated by rays 40, from a light source 42, and direct light of the source 42, as rays 44, to a detector assembly 46. The light source 42 is positioned, preferably but not necessarily, along a central optical axis 48 of the telescope 20, between the mirrors 22 and 24, and held in its position by an arm of the frame 36. The detector assembly is held also by an arm of the frame 36 at a point of convenience, such as on the axis 48 in front of the secondary mirror 24, between the secondary mirror 24 and the light source 42. By way of example in the construction of the telescope 20, both of the mirrors 22 and 24 are disposed symmetrically about the axis 48. As used herein, the term "light" includes electromagnetic radiation in the visible portion of the spectrum as well as radiation from other portions of the spectrum such as infrared and ultraviolet radiation.

The detector assembly 46 may comprise an array of photodetectors (not shown) for detecting individual spots of light transmitted as separate beams of light from each of the optical elements 38, the array of detectors of the detector assembly 46 providing data as to the locations of the light spots to a computer 50 connected electrically to the detector assembly 46. The locations of the light spots is dependent on the shape and orientation of the reflecting surface of the primary mirror 24, and any deviation from their designated locations represents a deformation in the reflecting surface of the primary mirror 22 from its prescribed shape. A set of servo actuators 52 interconnect the mirror 22 with the frame 36. The servo actuators 52 are driven by the computer 50. Correction of the shape of the reflecting surface of the primary mirror 22 is accomplished by operating the set of servo actuators 52 under control of the computer 50 to null out the deflections in the locations of the light spots. Also, if desired, the image provided by the imaging system 34 may be processed further by the computer 50 to compensate for the disruptive deflections of the mirror 22, based on the locations of the light spots, to provide a more accurate representation of the subject 26.

Figure 2:
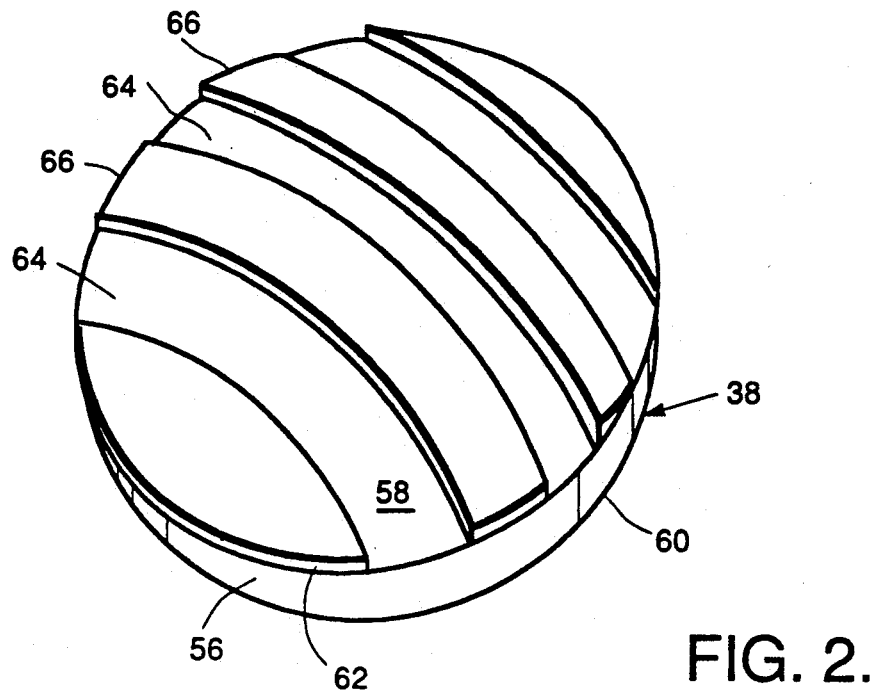
FIGS. 2 and 3 show construction and orientation of holographic elements of FIG. 1.
Figure 3:
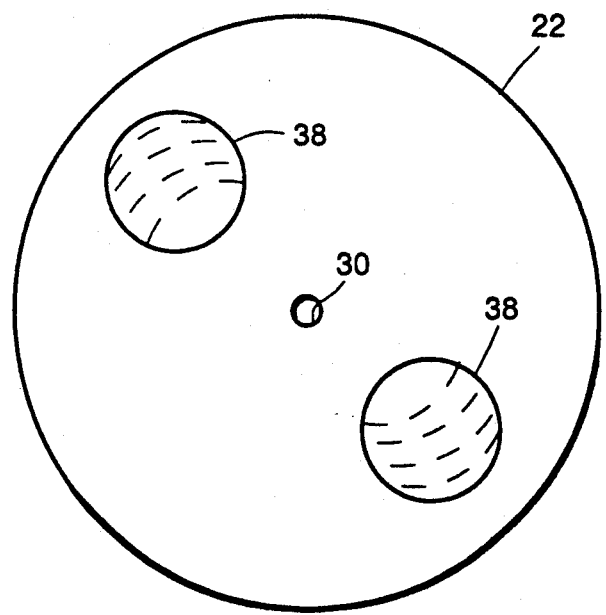

FIGS. 2 and 3 give details in the construction and positioning of an optical element 38 in accordance with a preferred embodiment of the invention wherein each optical element 38 is constructed as a holographic optical element. While it is possible to align or to sense the figure of the telescope 20 by employing mirrors having flat or slightly concave reflecting surfaces, as the optical elements 38, for directing light from the source 42 to the detector assembly 46, the use of the holographic optical element is preferred in order to attain a better beam definition and much greater ease in aligning each optical element. The holographic optical element comprises a fragmentary portion of a reflective zone plate wherein the complete zone plate (not shown) would be concentric with the primary mirror 22, and equal in size to the primary mirror 22. Such a zone plate would convert diverging rays of light from a light source located at the focus of the zone plate into a collimated beam of radiation directed parallel to the axis 48. Any fragmentary portion of the zone plate would transmit only a small portion of the rays of the collimated beam, which small portion would, in itself, be a collimated beam of relatively narrow diameter. Thereby, each optical element 38, constructed as a holographic optical element, develops a narrow collimated beam which is focussed, in turn, by the primary mirror. Alternatively, the HOE or zone plate can be designed to provide the focussing power of the primary mirror 22, in which case the zone plate is coated with a reflective coating. By reducing the spacing between zones of the zone plate, this being equivalent to selecting a fragmentary portion from a more distant region of the zone plate, at a larger radius of the plate, the diffracted rays from the holographic optical element are tilted toward the detector assembly 46. Thereby, the beam emanating from each individual optical element 38 can be directed to a specific location in the detector assembly 46 of the detectors 42.

It is noted that the optical elements 38, constructed as HOE's, are operative to diffract light, this resulting in the generation of diffracted rays of different orders. The diffracted ray of zero order is directed in the same direction as the propagation direction of a beam reflected from a plane mirror at the site of a optical element 38. This is indicated in FIG. 1 by a ray 54 which propagates out of the telescope 20 so as to avoid interference with the operation of the figure/wavefront sensing of the mirror 22. The rays 44 represent a higher order of diffraction, and are directed, as noted above, to the detector assembly 46.

As shown in FIG. 2, the zone-plate construction (HOE) of the optical element 38 is attained by use of an optically flat transparent substrate 56, such as a glass substrate, having opposed planar surfaces. Alternatively, the top surface may be concave or convex so as to provide additional focussing or defocussing power. One of the surfaces is a face 58 of the substrate 56, and the other of which is a back side 60 of the the substrate 56. A light-reflective coating 62, preferably of a highly reflective metal such as chromium or aluminum, is deposited on the face 58 of the substrate 56. Flat arcuate channels 64 are formed upon the face 58 by etching the coating 62, the channels 64 being separated by ridges 66 of the coating 62. Alternatively, the zones can be formed by etching channels of a desired configuration in the substrate, such as a binary optic square-shaped channel or a channel of sinusoidal configuration, and then depositing the metal coating.

As shown in FIG. 3, the optical elements 38 are oriented such that the ridges 66 and the channels 64 of larger radii of curvature are located at a greater distance from the center of the primary mirror 22, and the ridges 66 and the channels 64 of smaller radii of curvature are located closer to the center of the primary mirror 22. Also, as is well known in the construction of zone plates, the width of the ridges 66 and of the channels 64 decreases with increasing distance from the center of the primary mirror 22. The relationship between wavelength of radiation and the radii of the various channels 64 and ridges 66 of a zone plate is well known, and need not be described herein in further detail for the generation of the desired beams of light.

Figure 4:
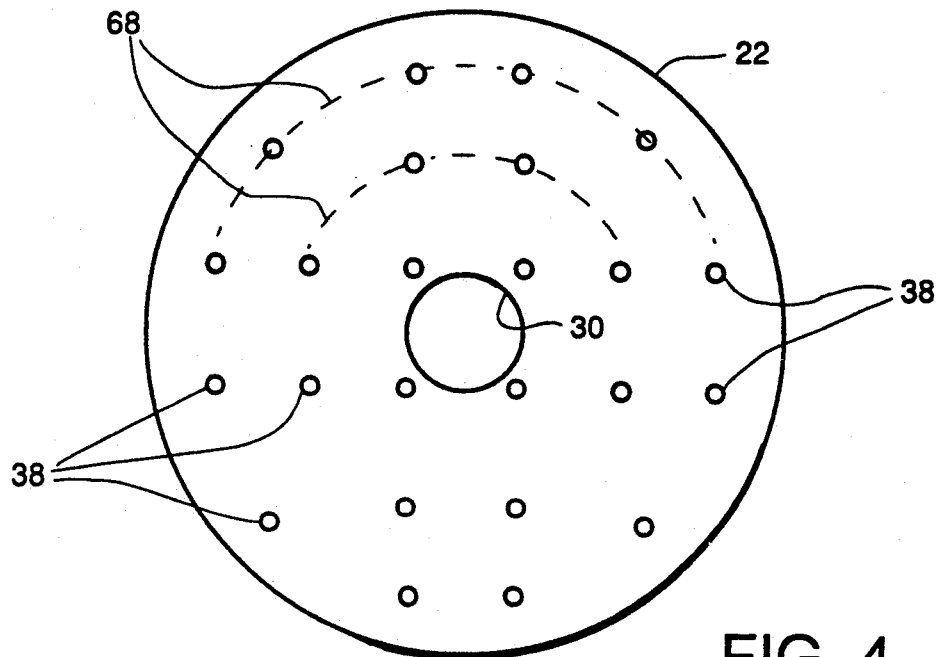
FIG. 4 shows a typical arrangement of holographic optical elements on the primary mirror.

FIG. 4 shows a preferred arrangement of the optical elements 38 upon the primary mirror 22. The optical elements 38 are arranged in concentric circles 68. This arrangement is convenient because it simplifies the construction of the optical elements 38 by providing identical construction for each of the optical elements 38 in any one of the circles 68. Optical elements 38 located at equal radii from the center of the mirror 22 have equal channels 64 and ridges 66. Therefore, the same lithographic process can be employed in constructing all of the optical elements 38 located in a common circle.

Figure 5:
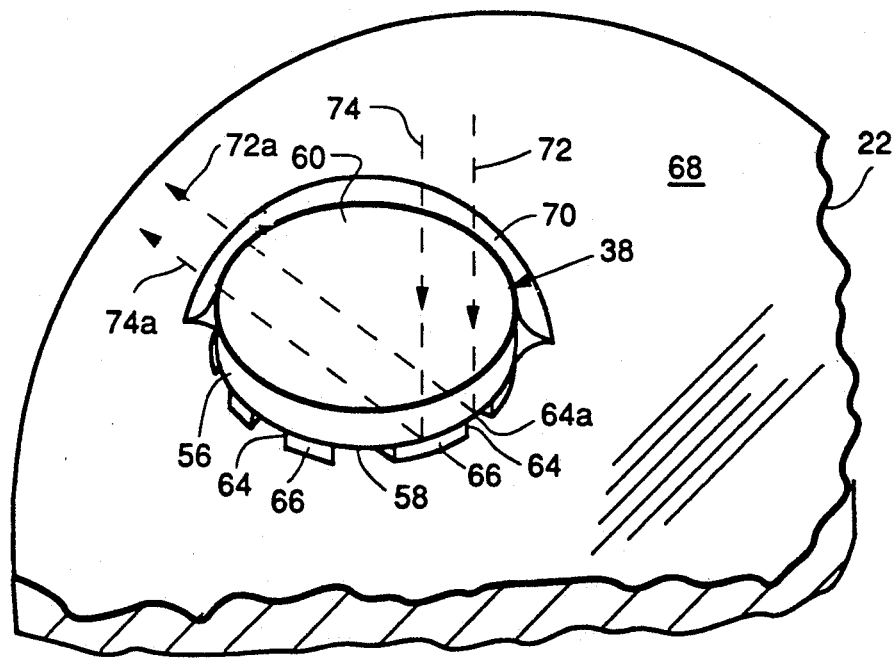
FIG. 5 shows a mounting of a holographic optical element to the reflecting surface of the primary mirror.

FIG. 5 shows a mounting of an optical element 38, formed as a holographic optical element, upon the reflecting surface 68 of the primary mirror 22. The optical element 38 is oriented with its face 58 facing the reflecting surface 68 of the mirror 22. The optical element 38 is held in position by a bead 70 of adhesive encircling the perimeter of the optical element 38, only a portion of the bead 70 being shown in the drawing. In the operation of the optical element 38, two rays 72 and 74 of light are shown, by way of example. The ray 72 propagates through the transparent substrate 56 to diffract from the face 58 within a channel 64, at point 64A, as ray 72A. The ray 74 propagates through the transparent substrate 56 to diffract from a surface of a ridge 66 as ray 74A. The diffracted rays 72A and 74A undergo a differential phase shift. Thereby, the optical element 38 functions as a holographic optical element. Furthermore, the adhesive bead 70 and the substrate 56 protect the zone plate features of channels 64 and ridges 66 on the face 58 from the environment. During a refurbishing of the primary mirror 22, each of the optical elements 38 is covered to protect the substrate 56 and the adhesive bead 70 from steps of stripping and reapplying of a reflective coating of the reflective surface 68 of the mirror 22. Alternatively, the adhesive bead and the materials of the optical element 38 are chosen to be insensitive to the stripping agents used in refurbishing the mirror 22.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a method of sensing optical signals from a mirror of an optical system by means of a set of optical elements disposed on a reflecting surface of the mirror to generate a set of auxiliary beams of light, the improvement comprising constructing each of said optical elements as a holographic optical element by providing a transparent substrate, and by forming features of at least a fragmentary portion of a zone plate on a face of said substrate; and;

mounting each of said optical elements upon said mirror, said mounting including an orienting of each of said optical elements with the substrate face facing said mirror.

2. A method according to claim 1 wherein said step of forming is accomplished by a step of depositing a metal coating on the substrate face, and etching said zone plate features into the coating on said substrate face.

3. A method according to claim 2 wherein said step of providing the substrate includes a step of configuring said substrate with opposed surfaces, one of said opposed surfaces being planar and serving as said substrate face.

4. A method according to claim 3 wherein a second of said opposed surfaces is planar.

5. A method according to claim 3 wherein a second of said opposed surfaces is convex.

6. A method according to claim 3 wherein a second of said opposed surfaces is concave.

7. A method according to claim 2 wherein said etching step provides said zone plate features as a set of arcuate channels spaced apart by arcuate ridges.

8. A method according to claim 1 wherein said mounting step is accomplished by applying an adhesive at the interface of a periphery of each of said optical elements with said mirror.

9. A method according to claim 1 further comprising a step of refurbishing said mirror by stripping and reapplying a coating to the reflecting surface of said mirror, said step of orienting each of said optical elements with the substrate face facing said mirror serving to protect each of said optical elements from said refurbishing step.

10. A method according to claim 1 wherein said refurbishing step includes a step of covering each of said optical elements to protect said optical elements from said stripping and said reapplying of the coating.

11. A method according to claim 1 wherein said aligning of said mirror is accomplished by locating said optical elements in concentric circles on the reflecting surface of said mirror; and said step of etching said zone plate features into said substrate face for each of said optical elements is accomplished by configuring said zone plate features separately for each of said circles for directing said set of auxiliary beams towards a common focal region.

12. A method according to claim 11 wherein said concentric circles are coaxial with an optical axis of the optical system.

* * * * *